PARALLEL T ACTIVE FILTERS WITH ADJUSTABLE Q

Filed June 4, 1968 4 Sheets-Sheet 1

INVENTOR
DALE M. UETRECHT

*William W. Breuning, Agent*

BY *Hurvitz, Rose & Greene*

ATTORNEYS

PARALLEL T ACTIVE FILTERS WITH ADJUSTABLE Q

Filed June 4, 1968

INVENTOR
DALE M. UETRECHT
William H. Breunig, Agent
BY Hurvitz, Rose & Greene
ATTORNEYS INVENTOR
DALE M. UETRECHT
BY William H. Breunig, Agent
Hurvitz, Rose & Greene
ATTORNEYS INVENTOR
DALE M. UETRECHT
BY William H Breunig, Agent
Hurwitz, Rose & Greene
ATTORNEYS United States Patent Office 3,550,027

Patented Dec. 22, 1970

3,550,027

PARALLEL T ACTIVE FILTERS WITH ADJUSTABLE Q

Dale M. Uetrecht, Cincinnati, Ohio, assignor to D. H. Baldwin Company, Cincinnati, Ohio, a corporation of Ohio Continuation-in-part of application Ser. No. 415,236, Dec. 2, 1964. This application June 4, 1968, Ser. No. 734,302

Int. Cl. H03f 1/38

U.S. Cl. 330—26 5 Claims

ABSTRACT OF THE DISCLOSURE

An electronic organ utilizing, as tone color filters, parallel T active filters with adjustable peaking employing a transistor in an emitter follower configuration employing parallel T RC networks, as distinct from a bridged T RC network. Adjustment of one component of one of the T networks adjusts peaking anywhere between 6 and 20 db, for a critical frequency of the filter, while maintaining the circuit stable and without modifying that critical frequency. The critical frequencies are corner frequencies for high and low pass configurations, and center frequencies for band pass and band rejection configurations.

CROSS-REFERENCES

This application is a continuation-in-part of my application for U.S. Pat. Ser. No. 415,236, filed Dec. 2, 1964, entitled Transistor RC Filters, now abandoned.

BACKGROUND OF THE INVENTION

Electronic organs commonly utilize tone color filters, which serve to process or filter square wave signals or saw-tooth wave signals, provided by a tone generator, so that when acoustically reproduced, the processed or filtered signals sound like one or another conventional musical instrument, such as a reed, or string or horn type instrument. Such filters normally require considerable peaking, and have in the past employed LC filtering to achieve this peaking. For example, an oboe sound can be simulated by passing sawtooth waves through a tone color filter having a strong resonance at about 1 kc. (+14 db) but a fairly flat response above 1 kc. (0 db) and a 12 db per octave roll off below 1 kc.

Sallen and Key, in the March 1955 issue of "IRE Transactions on Circuit Theory," pp. 74–85, have disclosed RC active filters employing vacuum tubes as active elements. When transistors are substituted for the vacuum tubes, it is found that the design criteria provided by Sallen and Key are inadequate, and that the circuitry of Sallen and Key must be modified. The necessary modifications are taught in my parent application, above identified.

However, it is now found that the transistorized Sallen and Key configuration can be radically improved for use as tone color filters by employing parallel T filters, instead of bridge T filters, in the broad configuration, provided that circuit values are appropriately chosen. Excellent stability can be obtained using standard 10% tolerance components.

Specifically, high pass, low pass, band pass and band rejection configurations are taught and adjustability of gain at a given corner frequency can be achieved over a wide range of values, by varying one parameter of the filter, without appreciably varying the critical frequency or the slope of roll off. For example, in a high pass filter, the Sallen and Key type configuration employs a transistor having an emitter follower load. Connected in series with the base are series capacitors to the junction of which a resistive feedback circuit R1 extends. A resistance R2 extends from the base of the transistor to a voltage point. For this circuit, as R1 is varied relative to R2, the gain of the amplifier at corner frequencies varies, and variations of from 5.5 db to −6 db have been obtained. Peaking of 14 db. at 1 kHz., required for simulating an oboe, is not attainable because the gain of an emitter follower is not ideal. Specifically, the voltage gain is not unity, and the current gain is not infinite.

In the circuit of the present invention, for a high pass configuration, a capacitor C is added, connected from the feedback point or emitter, to a mid-point of R2, thereby converting the Sallen and Key configuration to a parallel T configuration. The gain of the filter at the corner frequency then can vary from 7 db to 23 db in response to variation of C, but the filter is otherwise insensitive to component tolerances of the usual 10% in that its slopes below and above corner frequency are fixed, as is its corner frequency. A minor variation of circuit configuration has therefore achieved a radical improvement of circuit performance and adjustability, in that the corner frequency response is readily adjustable without varying filter response in other respects and can be adjusted to provide 14 db of gain at its corner without instability, even when 10% tolerance components are employed.

It is contended that active filters employing parallel T networks are per se inventive over those employing bridged T networks, but also further that applicant has discovered that extreme values of peaking can be achieved, over 20 db, without instability, and with adjustability of peaking in response to a small variation of one control parameter. For application to a tone color filter, for use in simulating the oboe, 14 db of peaking is required. If a circuit according to the invention is fabricated with 10% components, its peaking may be anywhere between 12 and 17 db. However, this wide range has a very small statistical probability and the normal range between 13 and 15 db is adequate for this tone color application. Adjustment of a small trimmer then enables peaking greater than the 14 db figure to be achieved. It has not heretofore been feasible to achieve a bridged T configuration using one transistor with 14 db of gain, i.e., when the theoretical ratio of $R_2$ and $R_1$ taught by Sallen and Key is used, the current loading of the transistor results in a gain far below 14 db. And in any event the maximum gain which can be achieved is 6 db using one transistor. Similarly, in the cases of band pass, low pass or band rejection filters, Q can be readily varied, and far higher Q's can be attained in the parallel T filters than in the bridged T filters of the Sallen and Key type.

SUMMARY OF THE INVENTION

A modification of the transistorized Sallen and Key RC active filter configuration, converting the latter to a parallel T RC active filter configuration, with consequent improvement of performance and adjustability. The modification is applicable to low pass, high pass, band pass and band rejection configuration, wherein, by proper choice of circuit parameters, Q or corner frequency gain can be modified over a wide range of values by modifying one circuit parameter, without materially affecting other operating characteristics of the filter, and gain at peaking frequencies can be achieved at high levels suitable for use in tone color filters.

DESCRIPTION OF THE PREFERRED EMBODIMENT

Figure 1:
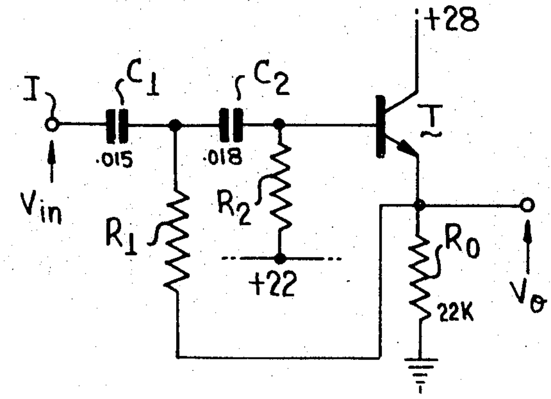
FIG. 1 PRIOR ART
FIG. 1 is a schematic circuit of a bridged T RC active high pass filter, known in the prior art.

In FIG. 1, an NPN transistor T has its collector connected directly to a voltage supply and its emitter connected to ground through a load resistance $R_o$, output voltage $V_o$ appearing across $R_o$. Input signal is applied to terminal I. Connected between terminal I and the base of T are capacitors $C_1$ and $C_2$, in series. A feedback resistance $R_1$ extends from the emitter of T to the junction of $C_1$ and $C_2$. Bias for the base of B is achieved by a resistance $R_2$ connected from the base of T to a point of positive voltage (+22 v.).

The circuit of FIG. 1 has a cut-off at 1 kHz., but can be peaked at that frequency above or below 0 db. It is then found that the response of the filter at 1 kHz. can vary considerably as the relative values of $R_1$ and $R_2$ vary.

The crucial point of the present invention is not in the use of a parallel T instead of a bridged T, RC circuit, in an active filter. The crucial point is that the value of C can be made relatively small so that the roll off of the filter is not materially affected by the presence of C, nor is the corner frequency materially affected; yet the gain at the corner frequency can be adjusted over a wide range of values. For example, in FIG. 2, a variation of $V_o/V_{in}$ at 1 kHz. (the corner frequency) between 7 db and 23 db is achieved as C varies from .001 to .0068 mf., taking pass freqnuencies as 0 db, and roll off is −12 db per octave and remains so for all adjustments of C. When C is made zero, the circuit of FIG. 2 reduces to the circuit of FIG. 1.

In the circuit of FIG. 1, variation of $R_1$ and $R_2$ is needed to vary gain at the corner frequency while maintaining corner frequency.

Variations of $V_o/V_{in}$ at 1 kHz., for various values of $R_1$ and $R_2$ are given in Table I.

TABLE I

| $R_2$ | $R_1$ | $V_o/V_{in}$ at 1 kHz. |
|---|---|---|
| 47K | 2.2K | 5.5 db |
| 33K | 3.3K | 3.2 db |
| 22K | 4.7K | 0.5 db |
| 15K | 6.8K | −2.7 db |
| 10K | 10K | −6 db |

As the ratio of $R_2$ to $R_1$ is increased beyond the 20 to 1 ratio, the transistor limitations cause the 1 kHz. gain to pass through a peak of about 6 db and then decreases.

Figure 2:
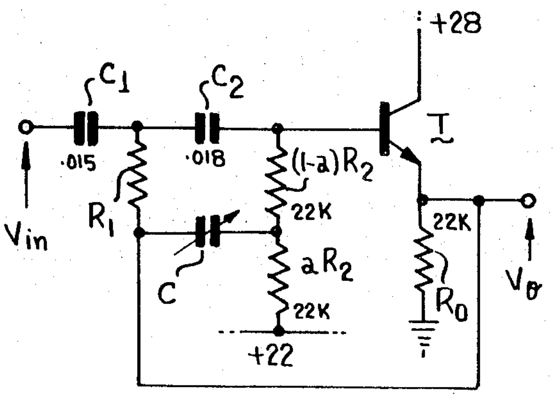
FIG. 2 is a schematic circuit diagram of a parallel T RC active high pass filter, representing an improvement in configuration over that of FIG. 1.

In FIG. 2 is illustrated a modification of the system of FIG. 1, in which a capacitor C has been added, extending from the emitter of T to the midpoint of R. The response of the circuit of FIG. 2 for various values of C, at 1 kHz. (the corner frequency of the filter) is given in Table II.

TABLE II

| C: | $V_o/V_{in}$ @ 1 kHz., db |
|---|---|
| .0068 | 23 |
| .0056 | 17 |
| .0047 | 14 |
| .0039 | 12 |
| .0033 | 11 |
| .0027 | 10 |
| .0018 | 8 |
| .001 | 7 |

The circuit of FIG. 2 therefore not only is more readily adjustable with respect to peaking amplitude, but also provides more than enough peaking for tone color requirements.

Figure 3:
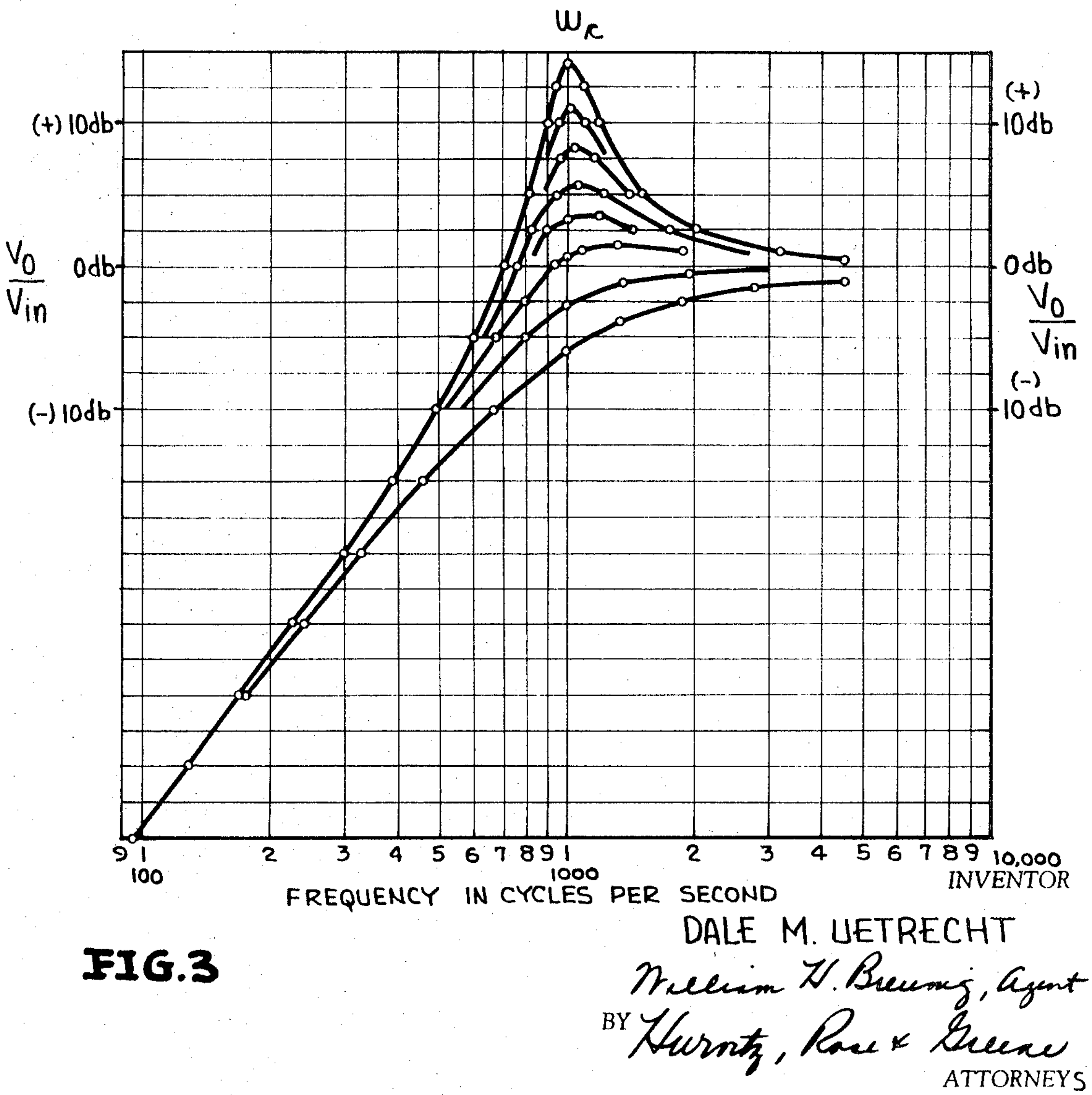
FIG. 3 is a plot of the response characteristics of the circuit of FIG. 2.

FIG. 3 provides a visual picture of the range of response characteristics which can be made available in both FIG. 1 and FIG. 2. The FIG. 2 circuit can be peaked to 23 db instead of 5 db, by adjustment of one trimmer capacitor, and component tolerances are otherwise not important. The peaking frequency remains at 1 kHz. as C is varied.

It can be shown that, for the circuit of FIG. 2, $$G \cong \frac{\frac{S_2}{W_o}}{1+\frac{dS}{W_o}+\frac{S^2}{W_o^2}} \tag{1}$$

where G is gain of the circuit, $V_o/V_{in}$,

S is complex frequency for which gain is measured, $$W_o \cong \frac{1}{\sqrt{R_1R_2C_1C_2}}$$

where $W_o$ is the corner frequency and $$\frac{1}{Q}=d\cong\frac{R_1(C_1+C_2)}{W_o}-\frac{a(1-a)R_2C}{W_o}$$

where Q is gain at the corner frequency.

If $C_1=C_2$, $a=½$, $C/C_1=f$ and $R_2=20\ R_1$ $$d\cong\frac{1}{\sqrt{5}}-\frac{\sqrt{5}}{2}f\cong.45-1.1f$$

If $Q=5$ and $d=.2$, $f=.25/1.1=.22$ by calculation. Using this value of $f$, the measured value of Q is 3.5, indicating the extent of approximation involved in the equations.

The important result is achieved that 14 db. of gain at a 1 kHz. corner frequency is achievable, and this gain can be achieved by preselection of one capacitor C. And the gain has adequate precision for variations of circuit parameters occuring in production runs employing 10% tolerance components.

Figure 4:
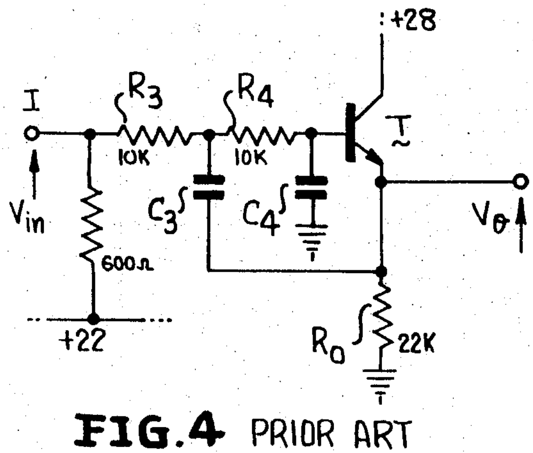
FIG.4 PRIOR ART
FIG. 4 is a schematic circuit diagram of a bridged T RC active low pass filter, known in the prior art.

Referring to FIG. 4, the known Sallen and Key type filter, resistances $R_3$ and $R_4$ are connected in series between input terminal I and the base of T. A capacitor $C_4$ is connected between that base and ground, and a feedback capacitor $C_3$ extends from the emitter of T to the junction of $R_3$ and $R_4$. The modification required by the present invention is to divide $C_4$ into two capacitors $C_4/a$ and $C_4/1-a$, as in FIG. 5, and to provide a feedback path to the junction of $C_4/a$ and $C_4/1-a$ from the emitter of T via a resistance R. Thereby feedback proceeds into two T sections, of opposite types, one made up of $C_3R_3R_4$, and the other of R, $C_4/a$, $C_4/1-a$. It can be shown that the gain of the circuit (G) as a function of S, is $$G\cong\frac{1}{1+\frac{ds}{W_o}+\frac{S^2}{W_o^2}}$$

where:

$$d\cong(R_1+R_2)C_2W_o-\frac{a(1-a)}{R_3C_2W_o}$$

$$W_o=\frac{1}{\sqrt{R_1R_2C_1C_2}}$$

($W_o$=corner frequency)

Figure 5:
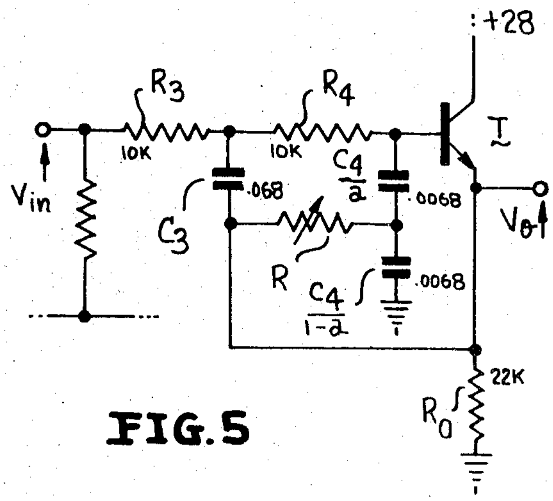
FIG. 5 is a schematic circuit diagram of a parallel T RC active low pass filter, representing an improvement of the system of FIG. 4.
Figure 6:
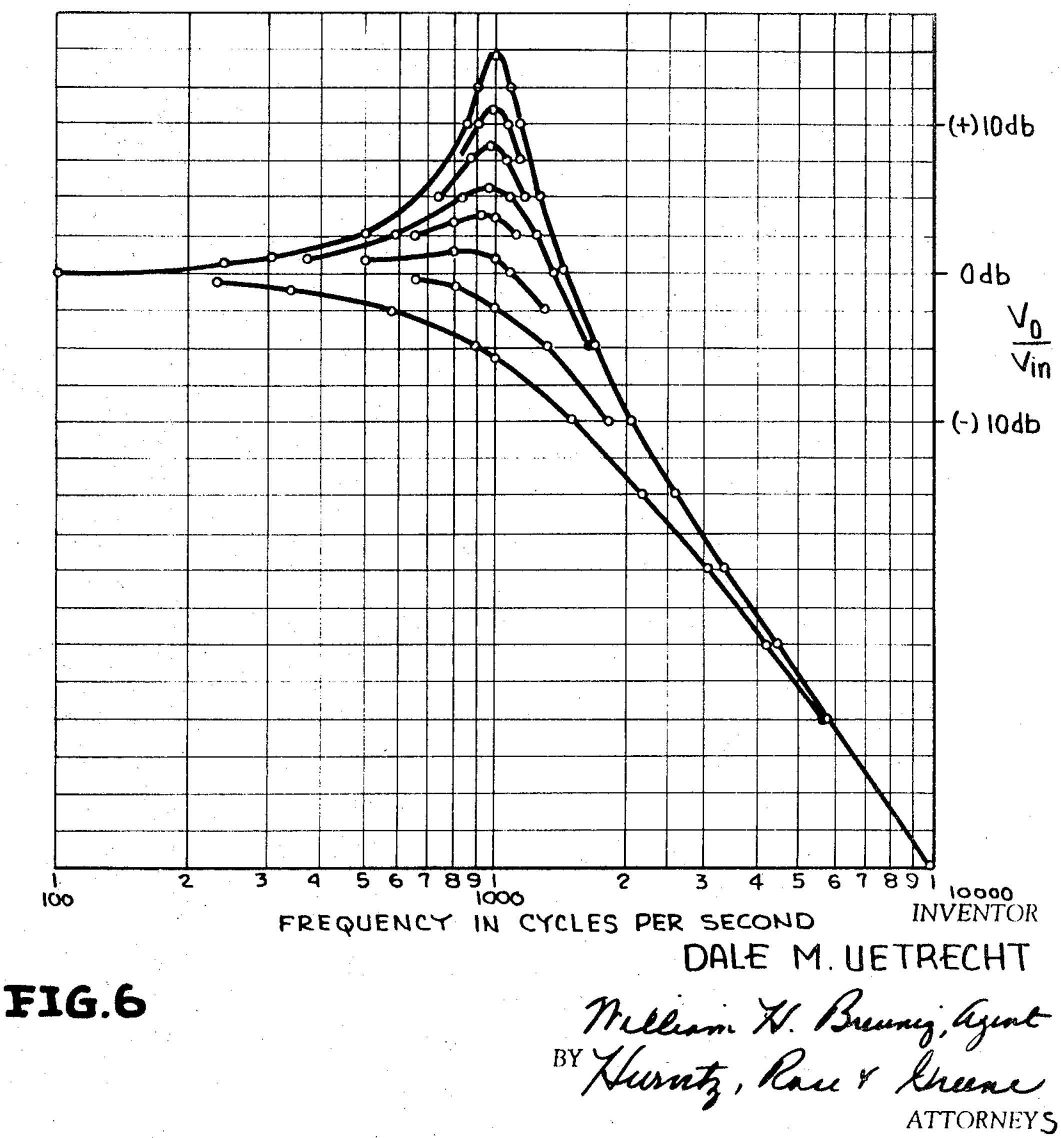
FIG. 6 is a plot of the response characteristics of the circuit of FIG. 5.

A set of response curves for the filter of FIGS. 4 and 5 is provided in FIG. 6, this circuit having a peak at 1 kHz.

Tables showing how the gain of the system of FIG. 4 varies, as relative values of $C_3$ and $C_4$ are varied, are given in Table III.

TABLE III

| $C_3$ | $C_4$ | $V_o/V_{in}$ at 1 kHz. |
|---|---|---|
| .068 | .0033 | 5.5 db |
| .047 | .0047 | 3.5 db |
| .033 | .0068 | .1 db |
| .022 | .010 | −2.2 db |
| .015 | .015 | −6 db |

For the values of circuit parameters given in FIG. 5, variations of gain of FIG. 5 as a function of values of R are given in Table IV.

TABLE IV

| R: | $V_o/V_{in}$ at 1 kHz., db |
|---|---|
| 22K | 26 |
| 27K | 19 |
| 33K | 15 |
| 39K | 13 |
| 47K | 11 |
| 56K | 10.3 |
| 82K | 8.5 |
| 150K | 7 |

By varying the value of R over an easily controllable range, 22K to 150K, gain at the corner frequency can vary from 7 to 26 db, and the circuit remains stable.

Figure 7:
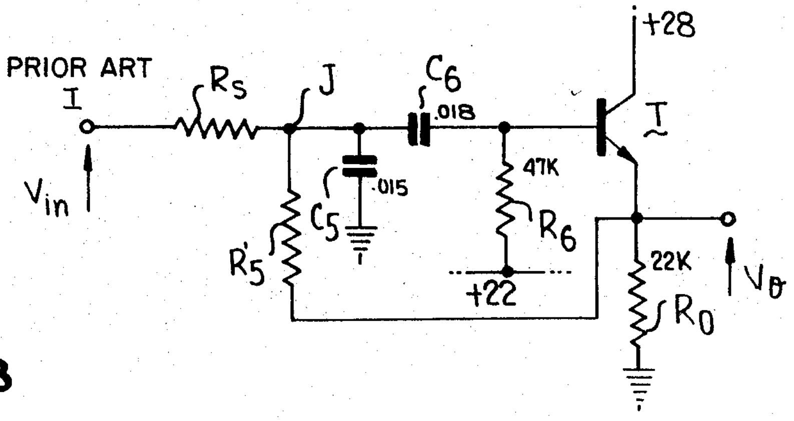
FIG. 7 PRIOR ART
FIG. 7 is a schematic circuit diagram of an active RC band pass filter employing a bridged T configuration.

In FIG. 7 is illustrated a Sallen and Key high pass filter with the input modified to obtain a band pass response with no phase inversion. In applying active filters to tone coloring, it is imperative to have approximately the same phase at the output of all filters so as to prevent cancellation in the output system. Transistor T has a collector connected directly to a positive power source and has a load $R_o$ connected between its emitter and ground. Connected in series between input terminal I and the base of T is connected a resistance $R_S$ and a capacitor $C^6$, shunt capacitor $C_5$ being connected between the junction J of $R_S$ and $C_6$ and ground, and a bias resistance $R_6$ from the base of T to a positive voltage point. Resistive feedback occurs from the emitter of T to the junction J via resistance $R_5'$. Gain of the circuit and its Q is a function of $R_S$, $R_5'$ and $R_6$, according to the following table. (In obtaining the values shown in Table V, the input voltage $V_{in}$ was adjusted so that the output voltage $V_o$ would be a direct representation of the circuit Q.)

TABLE V

| $V_{in}$ | $R_s$ | $R_5'$ | $R_6$ | $V_o$ at 1 kHz. |
|---|---|---|---|---|
| 13.5 db | 47K | 2.2K | 47K | 3.5 db |
| 10.2 db | 33K | 2.2K | 47K | 2.5 db |
| 7 db | 22K | 2.2K | 47K | 1.0 db |
| 3.5 db | 15K | 2.7K | 47K | −0.7 db |
| 0 db | 10K | 2.7K | 47K | −3.0 db |
| 0 db | 10K | 4.7K | 27K | −4.8 db |
| 0 db | 10K | 10K | 18K | −6.5 db |

Figure 9:
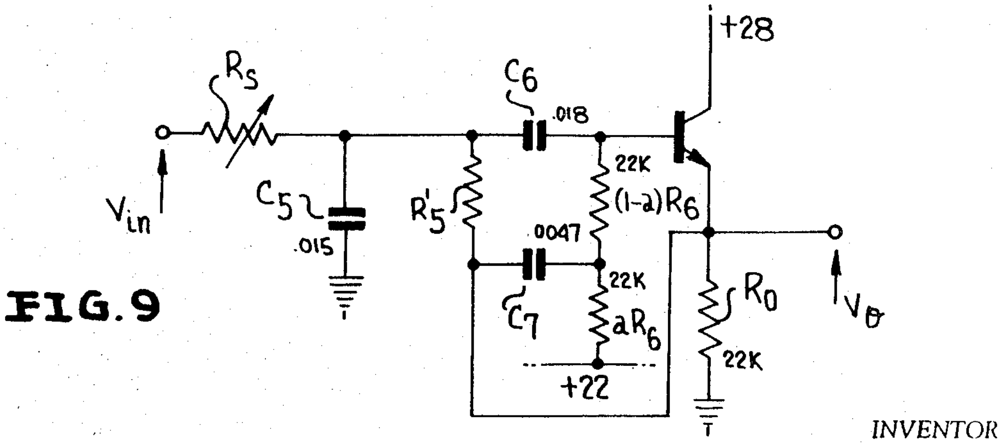
FIG. 9 is a schematic circuit diagram of an active RC band pass filter employing a parallel T configuration.

The circuit of FIG. 7 can be modified to be a parallel T circuit, as at FIG. 9, by adding a capacitor feedback path via $C_7$ to the junction of $(1-a)$ $R_6$ and $aR_6$.

It is now found that the gain of the circuit at its peak response frequency, i.e., its Q, is a function of $R_S$, as indicated in Table VI.

TABLE VI

| $V_{in}$ | $R_s$ | $R_1'$ | $V_o$ at 1 kHz. |
|---|---|---|---|
| 20 db | 100K | 2.2K | 12.7 db |
| 16.7 db | 68K | 2.2K | 11.2 db |
| 13.5 db | 47K | 2.2K | 9.5 db |
| 10.5 db | 33K | 2.2K | 7.2 db |
| 7 db | 22K | 2.2K | 5 db |
| 3.5 db | 15K | 2.7K | 2 db |
| 0 db | 10K | 2.7K | −1 db |

Figure 8:
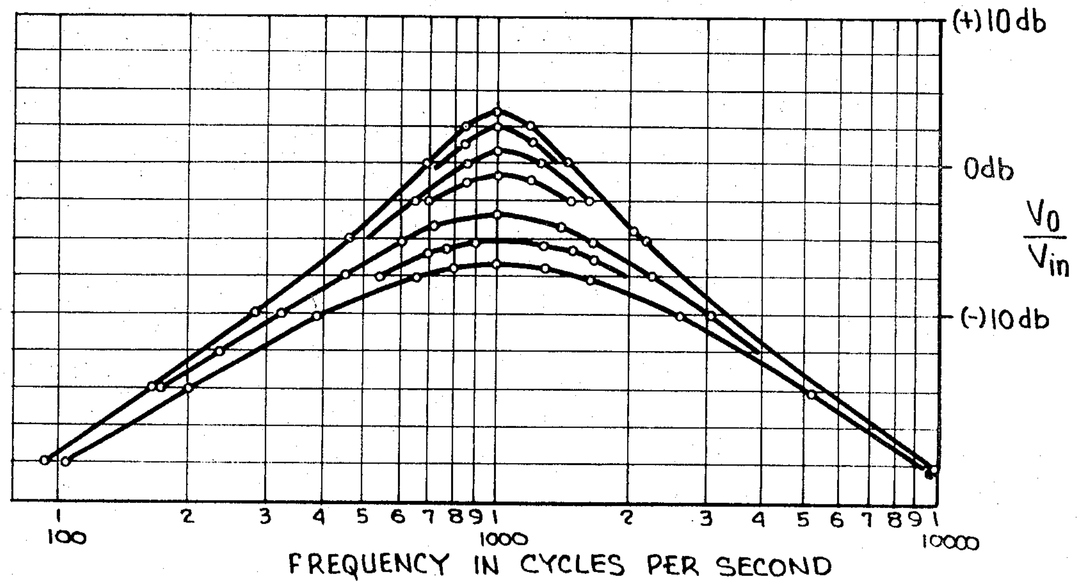
FIG. 8 is a plot of response characteristics of the circuit of FIG. 7.
Figure 10:
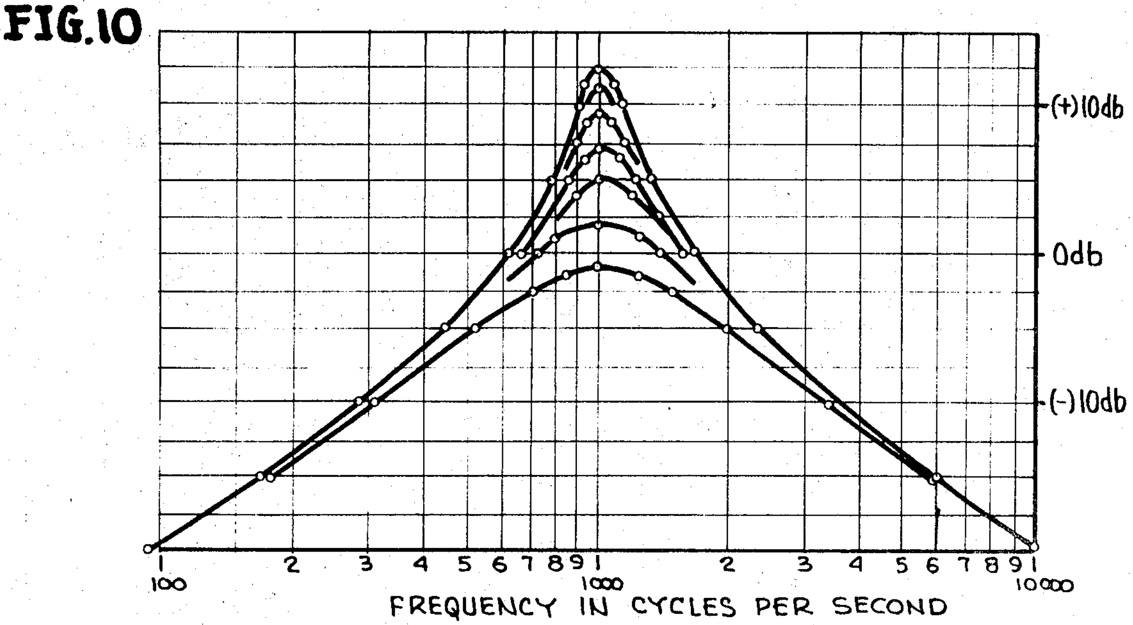
FIG. 10 is a plot of response characteristics of the circuit of FIG. 9.

The presence of $C_7$ in this configuration maintains stability while permitting high Q values to be achieved. Here FIG. 8 indicates the range of Q values that can be achieved with the configuration of FIG. 7, while FIG. 10 shows the range of Q values that can be achieved with the configuration of FIG. 9, the sole difference being the absence and presence of capacitor $C_7$.

For the band pass filter, it can be shown that $$G=\sqrt{\frac{C_6}{C_5}}\ \sqrt{\frac{R_1R'_5}{R_S}}\ \frac{S/W_o}{1+dS/W_o}+S^2/W_o^2$$

where:

$$d=1/Q=R_5(C_5+C_6)W_o+\frac{R_5R_6}{R_S}(C_6+aC_7)W_o-W_oa(1-a)R_6C_7$$

where:

$$W_o=\sqrt{\frac{1}{R_1R_2C_1C_2}}$$

$$R_5=\frac{R'_5R_S}{R'_5+R_S}\cong R'_5,\text{ where } R_S \text{ is} \gg R'_5$$

Figures 11, 12:
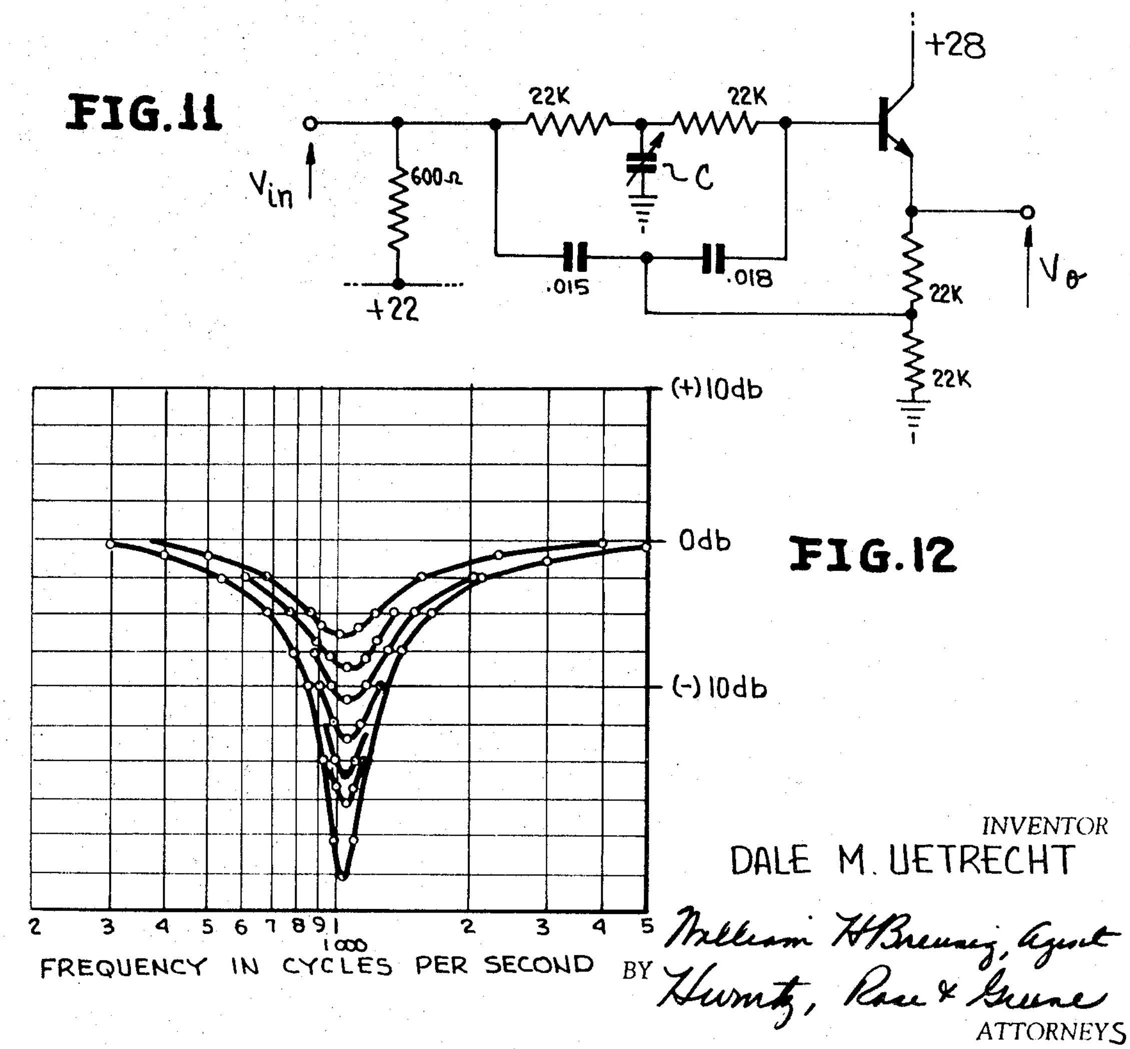
FIG. 11 is a schematic circuit diagram of an active RC band rejection filter, employing a parallel T configuration.
FIG. 12 is a plot of response characteristics of the circuit of FIG. 11.

The circuit configuration employed for a band rejection filter is illustrated in FIG. 11, its range of response characteristics in FIG. 12, and in Table VII is indicated the range of Q values which can be achieved as C′ is varied over a relatively small range.

TABLE VII

| C′: | $V_o/V_{in}$ at 1 kHz., db |
|---|---|
| ---- | −6.5 |
| .001 | −8.5 |
| .0018 | −10.8 |
| .0027 | −13.3 |
| .0033 | −15.7 |
| .0039 | −18 |
| .0047 | −22.5 |
| .0056 | −28.7 |
| .0068 | −33 |

I claim:

1. A high pass audio color filter for an electric organ, comprising:
   - a transistor having a collector, an emitter and a base,
   - a source of supply voltage connected to said collector,
   - a load resistance connected between said emitter and ground,
   - a signal input terminal,
   - two capacitors connected in series with each other between said input terminal and said base,
   - a resistance connected between said emitter and the junction of said two capacitors,
   - two resistances connected in series with each other between said base and a point of reference potential, and
   - a capacitor connected between said emitter and the junction of said two series resistances, said capacitor having a value selected to provide a variable gain at the corner frequency over a range of from 6 to 20 db, the remaining components having been previously selected to provide a 12 db per octave roll off and a corner frequency gain of about 6 db.

2. A band pass filter consisting of:
   - a transistor having a collector,
   - a base and an emitter,
   - a resistive load connected between said emitter and ground,
   - a source of supply voltage connected to said collector,
   - a signal input terminal,
   - a resistance and a capacitor connected in the order recited between said input terminal and said base,
   - a capacitor connected between the junction of said resistance and capacitor and ground, two resistances connected in series with each other between said base and a point of reference potential, a feedback resistance connected between said emitter and said junction, and a feedback capacitor connected between said emitter and the junction of said two series resistances.

3. A low pass audio tone color filter for an electric organ, comprising:

a transistor having a collector, an emitter and a base, a source of supply voltage connected to said collector, a load resistance connected between said emitter and ground, a signal input terminal, two resistances connected in series with each other between said signal input terminal and said base and forming a junction between said resistances, a capacitive feedback circuit connected between said emitter and said junction, two capacitors connected in series with each other between said base and ground, and a resistive feedback circuit connected between said emitter and the junction of said two capacitors, and resistive feedback circuit consisting of a series resistance.

4. An active RC filter, comprising:

a transistor having a base, an emitter and a collector, a load resistance connected between said emitter and ground, an input circuit for said filter connected between an input terminal and said base, said input circuit comprising a T network consisting of capacity and resistance, said T network consisting of two series elements connected between said input terminal and said base and of a shunt element connected between the junction of said series elements and ground, and a feedback path including a circuit element connected between said emitter and said junction point and a further T network extending between said emitter and said base, said further T network consisting of two further circuit elements of identical type extending in series between said base and a point of reference potential and a further shunt element of type diverse from the types of said two circuit elements of identical type extending from said emitter to the junction of said two circuit elements of identical type, wherein the type of elements employed consist entirely of capacitors and resistors, capacitors being of one type and resistors of another type, the two T networks being configured to provide net positive feedback adjacent one critical response frequency only to an extent assuring about 14 db of gain with stability, the gain of said filter at said critical response frequency being a function of the value of said further shunt element only and said critical response frequency being independent of the value of said further shunt element.

5. An active RC filter, comprising:

a transistor having a base, an emitter and a collector, a load resistance connected between said emitter and ground, two networks each having an input terminal, an output terminal and a reference terminal, one of said T networks comprising:

two impedances of a first type connected in series between its input terminal and its output terminal and a feedback impedance of a second type connected between the junction of said two impedances and its reference terminal, the second of said T networks comprising:

two impedances of said second type connected in series between its input terminal and its output terminal, and a feedback impedance of said first type connected between the junction of said two impedances of said second type and its reference terminal, both of said output terminals being connected to the base of said transistor, and both of said reference terminals being connected to the emitter of said transistor, the input terminal of one of said T networks being connected to a point of reference potential, signal being applied to the second of said T networks, the feedback impedance of the first of said T networks controlling the gain at a critical frequency, whereas the critical frequency is determined by the remainder of the impedances of the two networks.

References Cited

UNITED STATES PATENTS 3,369,189 2/1968 Hoffman et al. -------- 330—109

ROY LAKE, Primary Examiner

JAMES B. MULLINS, Assistant Examiner

U.S. Cl. X.R.

84—1.04; 307—295; 330—31, 94, 107